(12) United States Patent
Schoonover

(10) Patent No.: US 7,125,031 B1
(45) Date of Patent: Oct. 24, 2006

(54) TOW BAR HAVING A SINGLE, CENTRALLY-LOCATED BALL-AND-SOCKET JOINT FOR ACCOMMODATING PITCH, YAW AND ROLL MOVEMENTS BETWEEN A TOWING VEHICLE AND A TOWED VEHICLE

(76) Inventor: Donald R. Schoonover, 4211 Rolling Hills Dr., Nixa, MO (US) 65714-8771

( * ) Notice: Subject to any disclaimer, the term of this patent is extended or adjusted under 35 U.S.C. 154(b) by 88 days.

(21) Appl. No.: 10/851,930

(22) Filed: May 24, 2004

(51) Int. Cl.
*B60D 1/54* (2006.01)
(52) U.S. Cl. .................................. 280/293; 280/491.3
(58) Field of Classification Search .................. 280/493, 280/494, 491.1, 491.3, 491.4, 495, 504, 511, 280/512, 513
See application file for complete search history.

(56) References Cited

U.S. PATENT DOCUMENTS

| | | | |
|---|---|---|---|
| 1,185,435 A | 5/1916 | Powell |
| 1,229,465 A | 6/1917 | Hudson |
| 1,422,129 A | 7/1922 | Reuse |
| 1,557,841 A | 10/1925 | Holmes |
| 1,730,077 A | 10/1929 | Isachsen |
| 2,027,499 A | 1/1936 | Tully |
| 2,071,883 A | 2/1937 | Hodny |
| 2,120,422 A | 6/1938 | Williams et al. |
| 2,133,065 A | 10/1938 | Weber |
| 2,139,970 A | 12/1938 | Moore |
| 2,440,877 A | 5/1948 | Russell |
| 2,457,885 A | 1/1949 | Gatch |
| 2,486,483 A | 11/1949 | Landen |
| 2,522,793 A | 9/1950 | Koeckritz |
| 2,664,300 A | 12/1953 | Danielson et al. |
| 2,746,771 A | 5/1956 | Gross |
| 2,795,435 A | 6/1957 | Ortiz et al. |
| 2,871,030 A | 1/1959 | Hollis |
| 2,916,301 A | 12/1959 | Cushman |
| 3,000,652 A | 9/1961 | Hawkins |
| 3,019,033 A | 1/1962 | Wegener et al. |
| 3,281,162 A | 10/1966 | Carson |
| 3,384,391 A | 5/1968 | Batke |
| 3,492,022 A | 1/1970 | Hansen |
| 3,572,765 A | 3/1971 | Tieben |
| 3,649,048 A | 3/1972 | Garnett |
| 3,679,231 A | 7/1972 | Derr, Jr. |
| 3,730,557 A | 5/1973 | Cox |
| 3,740,074 A | 6/1973 | Coil |
| 3,794,355 A | 2/1974 | Cracolice |
| 3,806,162 A | 4/1974 | Milner |
| 3,829,131 A | 8/1974 | Moore, Jr. |
| 3,843,164 A | 10/1974 | Flegel |
| 3,848,890 A | 11/1974 | MacAlpine |

(Continued)

FOREIGN PATENT DOCUMENTS

CA          844457      7/1970    ................. 280/42

(Continued)

*Primary Examiner*—Tony Winner
(74) *Attorney, Agent, or Firm*—Donald R. Schoonover (57) ABSTRACT

A tow bar having a first connection mechanism with a forward projection for connecting to a conventional receiver hitch of a towing vehicle, a second connection mechanism for connecting to a towed vehicle, and a third connection mechanism having a ball member rotatively captured with a socket member and a pair of towbar arms pivotally-connected to an exposed portion of the ball member for connecting the first connection mechanism to the second connection mechanism. The tow bar also includes a securing mechanism for locking the tow bar in a stowed configuration on the rear of the towing vehicle.

16 Claims, 5 Drawing Sheets

U.S. PATENT DOCUMENTS

| | | |
|---|---|---|
| 3,938,830 A | 2/1976 | Lane |
| 3,947,062 A | 3/1976 | Pierce |
| 3,998,471 A | 12/1976 | Lutchemeier |
| 4,073,508 A | 2/1978 | George et al. |
| 4,200,306 A | 4/1980 | Helms |
| 4,326,730 A | 4/1982 | Tomen |
| 4,548,423 A | 10/1985 | Craven |
| 4,588,199 A | 5/1986 | Fisher |
| 4,603,874 A | 8/1986 | Merrill |
| 4,640,523 A | 2/1987 | Wolmarans |
| 4,711,461 A | 12/1987 | Fromberg |
| 4,714,264 A | 12/1987 | Woestelandt |
| 4,727,949 A | 3/1988 | Rea et al. |
| 4,768,803 A | 9/1988 | Hewitt et al. |
| 4,856,805 A | 8/1989 | Davis |
| 4,861,061 A | 8/1989 | Frantz |
| 4,869,521 A | 9/1989 | Johnson |
| 5,000,473 A | 3/1991 | Johnson |
| 5,071,153 A | 12/1991 | Duncan |
| 5,088,754 A | 2/1992 | Skelton |
| 5,112,074 A | 5/1992 | Smith |
| 5,186,483 A | 2/1993 | Sheppard |
| 5,224,960 A | 7/1993 | Duncan |
| 5,232,240 A | 8/1993 | Johnson |
| 5,308,100 A | 5/1994 | Heider et al. |
| 5,316,330 A | 5/1994 | Bergeron |
| 5,346,243 A | 9/1994 | Boeck |
| 5,356,166 A | 10/1994 | Hahne et al. |
| 5,516,140 A | 5/1996 | Hinte |
| RE35,482 E | 3/1997 | Johnson |
| 5,765,851 A | 6/1998 | Parent |
| 5,873,595 A | 2/1999 | Hinte |
| 5,909,887 A | 6/1999 | Hobrath |
| 6,168,182 B1 | 1/2001 | Ford |
| 6,502,847 B1 | 1/2003 | Greaves |
| 6,612,604 B1 | 9/2003 | Greaves |

FOREIGN PATENT DOCUMENTS

| | | | |
|---|---|---|---|
| CA | 1171112 | 7/1974 | ................ 280/141 |
| GB | 725339 | 3/1955 | |
| SE | 153309 | 1/1952 | |
| SU | 269114 | 1/1971 | .............. 280/491.4 |

TOW BAR HAVING A SINGLE, CENTRALLY-LOCATED BALL-AND-SOCKET JOINT FOR ACCOMMODATING PITCH, YAW AND ROLL MOVEMENTS BETWEEN A TOWING VEHICLE AND A TOWED VEHICLE

BACKGROUND OF THE INVENTION

1. Field of the Invention

The present invention is related to accessories for vehicles and, more specifically without limitation, to apparatus for towing a vehicle behind another vehicle.

2. Discussion of the Related Art

Many times an individual finds himself in a situation where he needs to move two vehicles, one or both of them having a prime mover and being operational, but no other driver is available to drive one of the vehicles for him. For example, a lone individual may attend an auction and purchase an automobile at the auction. He then has two vehicles to take away from the auction: his personal vehicle and the vehicle he purchased at the auction. A more common situation occurs for persons traveling in a motorhome. Most motorhomes are too large to conveniently visit many sites of interest near an overnight stop-over. As a result, many motorhome users tow a small automobile behind their motorhome so the small automobile can be used for local transportation after the motorhome has been parked.

Various devices are used for towing a vehicle, sometimes referred to as a towed vehicle, behind another vehicle, sometimes referred to as a towing vehicle. One such device is commonly referred to as a dolly. The dolly is generally a two-wheeled vehicle with a tongue that connects to a trailer hitch, such as a ball-type hitch, fixedly connected to the rear of the towing vehicle. To tow a vehicle with the dolly, the vehicle to be towed is driven up behind the dolly, and by use of a small ramp-like arrangement, onto the dolly so the front wheels of the towed vehicle are supported by the dolly. The front wheels are then securely clamped to the dolly, such as with chains and turnbuckles, or other suitable clamping arrangement. When the towing vehicle is driven forward, the dolly follows the towing vehicle by virtue of the connection between the dolly and the trailer hitch of the towing vehicle, and the towed vehicle follows the dolly by virtue of the front wheels of the towed vehicle being clamped to the dolly.

Horizontal movement of the towing vehicle relative to horizontal movement of the dolly about a vertically-oriented axis, sometimes referred to as the yaw axis, is accommodated by the connection of the dolly to the ball-type trailer hitch on the rear of the towing vehicle. Unfortunately, however, the magnitude of vertical movement of the towing vehicle relative to vertical movement of the dolly about a transverse horizontally-oriented axis, sometimes referred to as the pitch axis, which can be accommodated by the ball-type trailer hitch on the rear of the towing vehicle is limited. Furthermore, the magnitude of roll movement of the dolly relative to the towing vehicle about a longitudinally oriented axis, sometimes referred to as the roll axis, which commonly occurs when the wheels of the towing vehicle are supported on a plane having a transverse axis that is not parallel to the transverse axis of the plane supporting the wheels of the dolly, which can be accommodated by the ball-type trailer hitch on the rear of the towing vehicle is also limited. As a result, severe roll or pitch movements between the dolly and the towing vehicle can force the connection between the dolly and the ball-type trailer hitch beyond the limits allowable by the ball-type hitch, sometimes with disastrous results.

The clamping arrangement between the front wheels of the towed vehicle and the dolly permits some pitch movement between the towed vehicle and the dolly by rotational movement of the front wheels of the towed vehicle about the front axles of the towed vehicle, which pitch movement minimally supplements the limited ability of the ball-type hitch arrangement to accommodate relative pitch movements between the towing vehicle and the dolly. However, the clamping connection between the front wheels of the towed vehicle and the dolly does not provide any additional accommodation for supplementing relative yaw movements or roll movements between the dolly and the towing vehicle.

Some dollies have an upper portion which minimally pivots about a vertical axis relative to a lower portion therebeneath. With the front wheels of the towed vehicle being clamped to the upper portion, the minimal pivoting allowed between the upper portion and the lower portion of this type of dolly does minimally accommodate some additional yaw movement between the towed vehicle and the towing vehicle. The minimal pivoting permitted between the upper portion and the lower portion of the dolly, however, does not provide any further accommodation for relative pitch movements or roll movement between the towed vehicle and the towing vehicle. Also, if the orientation of the front wheels of the towed vehicle that are clamped to the dolly is not locked, additional yaw movement, but not roll movement, can be accommodated by the ability of the front wheels of the towed vehicle to turn back and forth as the towed vehicle turns relative to the dolly.

A major drawback with the use of a dolly occurs when it becomes necessary to back up the tandem assemblage comprised of the towing vehicle connected to the dolly connected to the towed vehicle. The towing vehicle has a set of wheels mounted on a front axle and another set of wheels mounted on a rear axle. The dolly has a set of wheels mounted on an axle, which constitutes a third axle spaced rearwardly from the two axles of the towing vehicle. The towed vehicle has a set of wheels mounted on its rear axle, which constitutes a fourth axle spaced further rearwardly from the two axles of the towing vehicle and from the axle of the dolly. To operatively manipulate the four axles, each having a pair of wheels in contact with the ground therebeneath, such as when the tandem assemblage needs to be backed up, is very difficult even for an experienced driver. Of course, the towed vehicle could be unchained and unloaded from the dolly and individually driven out of the way, the dolly disconnected from the towing vehicle and physically placed out of the way, and the towing vehicle could then be backed up as needed. Obviously, such extra time and effort to simply back up the towing vehicle would be bothersome and aggravating, to say the least.

Another device that is used to tow a towed vehicle behind a towing vehicle is a tow bar. Tow bars are readily available in many different forms. Tow bars usually have either a socket at the forward end thereof for connecting to a ball-type hitch fixedly connected to the rear of the towing vehicle, or a square-shaped forwardly-extending tube for connecting to a conventional receiver hitch fixedly connected to the rear of the towing vehicle. In addition, tow bars usually have two towbar arms extending rearwardly to connect to the front end of a towed vehicle to thereby form a triangularly-shaped arrangement between the two towbar arms and the front end of the towed vehicle.

One such tow bar is disclosed in U.S. Patent No. RE35,482 issued Mar. 25, 1997 to Andrew B. Johnson. The Johnson tow bar includes a forwardly-extending hitch tube for connecting to a conventional receiver hitch of a towing vehicle. A roll axis is defined by a longitudinally-oriented pin pivotally connecting a rearwardly-directed yoke to a plate attached to the hitch tube. A pivot block, spaced rearwardly from the longitudinally-oriented pin, has a transverse horizontally-oriented throughbore oriented perpendicularly to the longitudinally oriented pin. A pitch axis is defined by a pin passing through the transverse horizontally-oriented throughbore of the pivot block, which pivotally connects the pivot block to the yoke. The pivot block also has a vertical-oriented throughbore spaced rearwardly from the transverse horizontally-oriented throughbore of the pivot block. A yaw axis is defined by a bolt passing through the vertically-oriented throughbore of the pivot block, which pivotally connects the pivot block to the forward ends of a pair of towbar arms. The rear end of each towbar arm includes a pivot arm for swinging around rearwardly to connect to a towed vehicle, or for swinging around forwardly to lock alongside the respective towbar arm for storage purposes. The Johnson tow bar can be pivoted upwardly about the transverse horizontally-oriented pin through the pivot block for storage on the rear of the towing vehicle.

One problem with the Johnson tow bar is the plurality of moving parts thereof. Each of those moving parts are operatively subjected to substantial wear and abuse and therefore failure during use, namely, the longitudinally-oriented pin, which is subjected to constant relative movement between the yoke and the plate attached to the hitch tube; the transverse horizontally-oriented pin, which is subjected to constant relative movement between the pivot block and the yoke; and the vertically-oriented pin, which is subjected to constant relative movement between the towbar arms and the pivot block.

Another problem with the Johnson tow bar is the spaced-apart configuration of the various articulation axes thereof; more specifically, accommodation of roll, pitch and yaw movements between the towing vehicle and the towed vehicle are confined to separately-defined and spaced-apart axes: the longitudinally-oriented pin through the rearwardly-directed yoke for roll movements, the transverse horizontally-oriented pin through the rearwardly-directed yoke and the pivot block for pitch movements, and the vertically-oriented pin through the pivot block and the forward ends of the towbar arms for yaw movements. The cause for concern in regard to the spaced-apart structuring of the articulation axes of the Johnson tow bar arises from moments that are operatively created in the tow bar, which moments can only be countered internally within the tow bar by pitting one part of the tow bar against another part of the tow bar. Moments which must be countered internally within the tow bar increase wear and tear of those tow bar parts and, as a result, decrease the meantime before failure of the tow bar. More specifically, in the structure of the Johnson tow bar, the yaw axis is spaced rearwardly from the pitch axis which, in turn, is spaced rearwardly from the roll axis which, in turn, is spaced vertically from the longitudinal axis of the receiver hitch.

Various force components are imposed by the towed vehicle on the vertical pin through the pivot block, the yaw axis, by virtue of the towed vehicle being connected to the vertically-oriented pin by the towbar arms. For example, in any turning situation where the towed vehicle is not lined up rearwardly from the towing vehicle, the towed vehicle causes the towbar arms to impose a transverse force component on the vertically-oriented pin through the pivot block. Although the yaw axis at that vertically-oriented pin of the Johnson tow bar can accommodate the transverse force components imposed thereon by the towed vehicle and the towbar arms, those transverse force components are, in turn, imposed on the vertically-oriented pin through the pivot block, and there is no other structure spaced forwardly therefrom that can provide another yaw axis to accommodate the transverse force components imposed on the vertically-oriented pin. The same reasoning applies whether the transverse force components are to the left or to the right—in other words, all turning situations.

Similarly, in any operative situation where the towing vehicle enters an upgrade or a downgrade before the towed vehicle enters that grade change or the wheels of the towing vehicle are momentarily supported on a plane that is at a different elevation than the plane supporting the wheels of the towed vehicle, the towed vehicle causes the towbar arms to impose a vertical force component on the vertically-oriented pin through the pivot block, which vertical force component is transferred to and accommodated by the pitch axis at the transverse horizontally-oriented pin through the pivot block. However, there is no other structure spaced forwardly from the transverse horizontally-oriented pin through the pivot block that can provide another pitch axis to accommodate the vertical force components imposed on the transverse horizontally-oriented pin through the pivot block. The same reasoning applies whether the vertical force components are upwardly or downwardly—in other words, all pitch situations.

Finally, at all operative times, the towed vehicle causes the towbar arms to impose longitudinal force fore-to-aft components or longitudinal aft-to-fore force components on the vertically-oriented pin through the pivot block, such as when the towing vehicle and towed vehicle are speeding up, slowing down, going up or down an incline, or just cruising. The fact that the longitudinally-oriented pin through the rearwardly-directed yoke is not aligned with the longitudinally-oriented axis of the receiver hitch of the towing vehicle, such constantly varying longitudinal force components imposed by the towed vehicle and the towbar arms create moments that must be countered internally by the plate attached to the hitch tube and by the connection of the longitudinally-oriented pin to that plate. The magnitude of the lever arm of that moment would be the spacing between the orifice through the rearwardly-directed yoke for the longitudinally-oriented pin and the receiver hitch of the towing vehicle.

In addition to the moments created by longitudinal force components in the longitudinally-oriented pin and the plate connecting that pin to the hitch tube, other moments which the Johnson tow bar must internally oppose from force components imposed on the tow bar by the towed vehicle and the towbar arms can be described as follows:

(a) transverse force components create (i) moments in the pivot block with the magnitude of the lever arm thereof being determined by the spacing between the vertically-oriented and transverse horizontally-oriented pins through the pivot block, (ii) moments in the rearwardly-directed yoke with the magnitude of the lever arm thereof being determined by the spacing between the vertically-oriented pin through the pivot block and the orifice through the rearwardly-directed yoke for the longitudinally-oriented pin, and (iii) moments in the longitudinally-oriented pin and the plate attached to the hitch tube with the magnitude of the lever arm thereof being determined by the spacing between the vertically-oriented pin through the pivot block and the hitch tube; and (b) vertical force components create (i) moments in the rearwardly-directed yoke with the magnitude of the lever arm thereof being determined by the spacing between the transverse horizontally-oriented pin through the pivot block and the orifice through the rearwardly-directed yoke for the longitudinally-oriented pin, and (ii) moments in the longitudinally-oriented pin and the plate attached to the hitch tube with the magnitude of the lever arm thereof being determined by the spacing between the transverse horizontally-oriented pin through the pivot block and the hitch tube.

Of course, the various parts of the Johnson tow bar could be constructed much more massively to enhance the strength thereof in an attempt to more capably withstand the moments created internally within the tow bar due to the spaced-apart structuring of the yaw, pitch and roll axes. Unfortunately, such over-construction would defeat the ability to provide a relatively light-weight, easily manageable tow bar having the structure disclosed by Johnson.

Another such tow bar is disclosed in U.S. Pat. No. 5,765,851 issued Jun. 16, 1998 to Richard A. Parent. The Parent tow bar includes a forwardly-extending hitch member for connecting to a conventional receiver hitch fixedly connected to the rear of a towing vehicle. A pitch axis is defined by a transverse horizontally-oriented bolt, which connects a forwardly-directed yoke to the hitch member. A roll axis is defined by a longitudinally-oriented bolt, which connects the forwardly-extending yoke to a rearwardly-extending yoke. A yaw axis is defined by a vertically-oriented bolt, which connects the rearwardly-directed yoke to the forward ends of a pair of towbar arms. The rear end of each towbar arm is connected to a towed vehicle.

As with the Johnson tow bar, one problem with the Parent tow bar is the plurality of moving parts thereof. Each of those moving parts is operatively subjected to substantial wear and abuse and therefore failure during use, namely, the transverse horizontally-oriented bolt, which is subjected to constant relative movement between the forwardly-directed yoke and the hitch member; the longitudinally-oriented bolt, which is subjected to constant relative movement between the forwardly-directed yoke and the rearwardly-directed yoke; and the vertically-oriented bolt which is subjected to constant relative movement between the rearwardly-directed yoke and the towbar arms.

Also as with the Johnson tow bar, another problem with the Parent tow bar is the spaced-apart configuration of the various articulation axes thereof; more specifically, accommodation of pitch, roll and yaw movements between the towing vehicle and the towed vehicle are confined to separately-defined and spaced-apart axes: the transverse horizontally-oriented pin through the hitch member and the forwardly-directed yoke for pitch movements, the longitudinally-oriented pin through the forwardly-directed and rearwardly-directed yokes for roll movements, and the vertically-oriented pin through the rearwardly-directed yoke and the forward ends of the towbar arms for yaw movements. As hereinbefore explained, the cause for concern in regard to the spaced-apart structuring of the articulation axes of the Parent tow bar arises from moments that are operatively created in the tow bar, which moments can only be countered internally within the tow bar by pitting one part thereof against another part thereof. Again, moments which must be countered internally within the tow bar by various parts of the tow bar increase wear and tear of those parts and, as a result, decrease the meantime before failure of the tow bar. In the structure of the Parent tow bar, the yaw axis is spaced rearwardly from the roll axis which, in turn, is spaced rearwardly from the pitch axis which, in turn, is spaced rearwardly from the receiver hitch of the towing vehicle.

Various force components are imposed by the towed vehicle on the vertically-oriented bolt through the rearwardly-directed yoke, the yaw axis, by virtue of the towed vehicle being connected to the vertically-oriented bolt by the towbar arms. For example, in any turning situation, the towed vehicle causes the towbar arms to exert a transverse force component on the vertically-oriented bolt through the rearwardly-directed yoke. Although the yaw axis at that vertically-oriented pin can accommodate transverse force components of the towed vehicle and the towbar arms, those transverse force components are imposed on the longitudinally-oriented bolt through the rearwardly-directed and forwardly-directed yokes, and there is no other structure spaced forwardly therefrom that can provide another yaw axis to accommodate the transverse force components imposed on the longitudinally-oriented bolt through the rearwardly-directed and forwardly-directed yokes.

Similarly, in any operative situation where the towing vehicle enters an upgrade or a downgrade before the towed vehicle enters that grade change or the wheels of the towing vehicle are momentarily supported on a plane that is at a different elevation than the plane supporting the wheels of the towed vehicle, the towed vehicle causes the towbar arms to impose a vertical force component on the vertically-oriented bolt through the rearwardly-directed yoke of the Parent tow bar. Although the pitch axis at the transverse horizontally-oriented bolt through the forwardly-directed yoke and the hitch member can accommodate such vertical force components imposed by the towed vehicle and the towbar arms, there is no other structure spaced forwardly therefrom that can provide another pitch axis to accommodate the vertical force components imposed on the transverse horizontally-oriented bolt.

As a result of the foregoing, the moments which the Parent tow bar must internally oppose from force components imposed by the towed vehicle and the towbar arms can be described as follows:

(a) transverse force components create (i) moments in the rearwardly-directed yoke with the magnitude of the lever arm thereof being determined by the spacing between the vertically-oriented bolt through the rearwardly-directed yoke and the longitudinally-oriented bolt through the rearwardly-directed and forwardly-directed yokes, (ii) moments in the forwardly-directed yoke with the magnitude of the lever arm thereof being determined by the spacing between the vertically-oriented bolt through the rearwardly-directed yoke and the transverse horizontally-oriented pin through the forwardly-directed yoke, and (iii) moments in the hitch tube with the magnitude of the lever arm thereof being determined by the spacing between the vertically-oriented bolt through the rearwardly-directed yoke and the hitch member; and (b) vertical force components create moments in the hitch member with the magnitude of the lever arm thereof being determined by the spacing between the transverse horizontally-oriented bolt through the forwardly-directed yoke and the hitch member.

Again, the various parts of the Parent tow bar could be constructed much more massively to enhance the strength thereof in an attempt to more capably withstand the moments created internally within that tow bar due to the spaced-apart structuring of the yaw, roll and pitch axes. And again, such over-construction would defeat the ability to provide a relatively light-weight, easily manageable tow bar having the structure disclosed by Parent.

A tow bar that has solved many of the problems of the Johnson and Parent tow bars is disclosed in U.S. Pat. No. 6,502,847 issued Jan. 7, 2003 to John Greaves. The Greaves tow bar includes a forwardly-extending hitching portion for connecting to a conventional receiver hitch fixedly connected to the rear of a towing vehicle. The equivalent of pitch, roll and yaw axes are all provided by a hitch ball member mounted in a hitch socket member with a rearwardly-directed hitch socket central aperture. The hitch ball member comprises two hemispheres, one spaced above the other in the hitch socket member. One of the hemispheres is fixedly attached to the forward end of one of the towbar arms, whereas the other hemisphere is fixedly attached to the forward end of the other towbar arm. The towbar arms extend rearwardly through the hitch socket central aperture. The hemispheres rotate relative to each other about a vertically-oriented axis when the towbar arms are spread apart to form a triangularly-shaped arrangement with the towed vehicle by use of two spaced-apart plate ball members fixedly connected to the rear ends of the towbar arms and connected to the front of the towed vehicle. Unfortunately, such relative rotation between the hemispheres with the towbar arms fixedly attached thereto reduces the remaining available spacing between the towbar arms and the periphery of the hitch socket central aperture and thereby reduces the extent of relative movement available for accommodating pitch and yaw movements between the towing vehicle and the towed vehicle. Although special slots are provided in the hitch socket central aperture in order to enhance the movement available for relative yaw movement, a pitch movement occurring at the same time as a yaw movement, which required use of the special slots, would defeat the intended purpose of the special slots.

An improvement provided by the Greaves tow bar over the Johnson and Parent tow bars is the substantial reduction in the number of moving parts that are subject to failure during use. However, with one of the towbar arms being fixedly attached to one of the hemispheres and the other towbar arm being fixedly attached to the other hemisphere, an internal moment is operatively created between the two hemispheres.

Unfortunately, a drawback of the Greaves tow bar is the failure to provide a means for conveniently and rotationally storing the tow bar on the rear of the towing vehicle. Due to the towbar arms being fixedly connected to the hemispheres, due to the towbar arms extending rearwardly through the hitch socket central opening, and due to the limited ability to rotate the hemispheres so the towbar arms can be displaced to an upright orientation, such convenient and rotational storability does not appear to be possible without substantial structural modification to the Greaves tow bar, which is not taught by that reference.

What is needed is a tow bar wherein the towbar arms thereof are not fixedly connected to hemispheres; wherein the towbar arms do not extend through a rearwardly-facing central opening in a manner that partially inhibits pitch and yaw movements between a towing vehicle and a towed vehicle; wherein the number of moving parts subject to failure during use is greatly reduced and preferably reduced to only a single operatively moving part when a towed vehicle is being towed by a towing vehicle; wherein the connection between the towbar arms does not create a moment between the tow bar arms in a hitch socket member; and wherein the tow bar can be conveniently stored on the rear of a towing vehicle without having to disconnect the tow bar from the towing vehicle.

PRINCIPAL OBJECTS AND ADVANTAGES OF THE INVENTION

The principal objects and advantages of the present invention include: providing a tow bar having towbar arms that are not fixedly connected to hemispheres; providing such a tow bar wherein the towbar arms do not extend through a rearwardly-facing central opening in a manner that partially inhibits yaw and pitch movements between a towing vehicle and a towed vehicle; providing such a tow bar wherein the number of different parts that may be subject to failure during use is greatly reduced, preferably to only a single moving part as a towed vehicle is being towed by a towing vehicle; providing such a tow bar wherein the number of moments created internally within the tow bar is minimized; providing such a tow bar wherein the connection between the towbar arms and a pivot connection thereof does not create a moment between the towbar arms in the pivot arrangement; providing such a tow bar that can be conveniently stored on the rear of a towing vehicle without having to disconnect the tow bar from the towing vehicle; and generally providing such a tow bar that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

The improvements of the tow bar of the present invention include a first connection mechanism having a forward projection for connecting to a conventional receiver hitch of a towing vehicle and defining a longitudinally-oriented axis that is fixed relative to the towing vehicle; a second connection mechanism having at least one bracket attached to a towed vehicle and defining a transverse horizontally-oriented axis that is fixed relative to the towed vehicle; and a third connection mechanism having a ball member rotatively captured within a socket member and a pair of towbar arms pivotally-connected to an exposed portion of the ball member for connecting the first connection mechanism to the second connection mechanism.

The present invention also includes a securing mechanism to lock the tow bar in a stowed configuration on the rear of the towing vehicle.

BRIEF DESCRIPTION OF THE DRAWING FIGURES

FIG. 8b is an enlarged and fragmentary, side elevational view of the optional notch-reinforcing mechanism of the tow bar of the present invention shown in FIG. 8a.

FIG. 9 is an enlarged and fragmentary, rear elevational view of a variation of the optional notch-reinforcing mechanism of the tow bar of the present invention shown in FIG. 8a.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a tow bar for connecting a towed vehicle to a towing vehicle in accordance with the present invention, as shown in FIGS. 1 through 6. The present invention 10 includes a first connection mechanism 13 for connecting the tow bar 10 to a towing vehicle 15, the first connection mechanism 13, upon insertion and securement in a conventional receiver hitch 17 of the towing vehicle 15 as indicated by the arrow designated by the numeral 19 in FIG. 1, operatively defining a longitudinally-oriented axis 21 that is fixed relative to the towing vehicle 15; a second connection mechanism 23 for connecting the tow bar 10 to a vehicle to be towed by the towing vehicle 15, sometimes referred to herein as the towed vehicle 25, the second connection mechanism 23 operatively defining a transverse horizontally-oriented axis 27 that is fixed relative to the towed vehicle 25; and a third connection mechanism 33 connecting the first connection mechanism 13 to the second connection mechanism 23.

Figure 1:
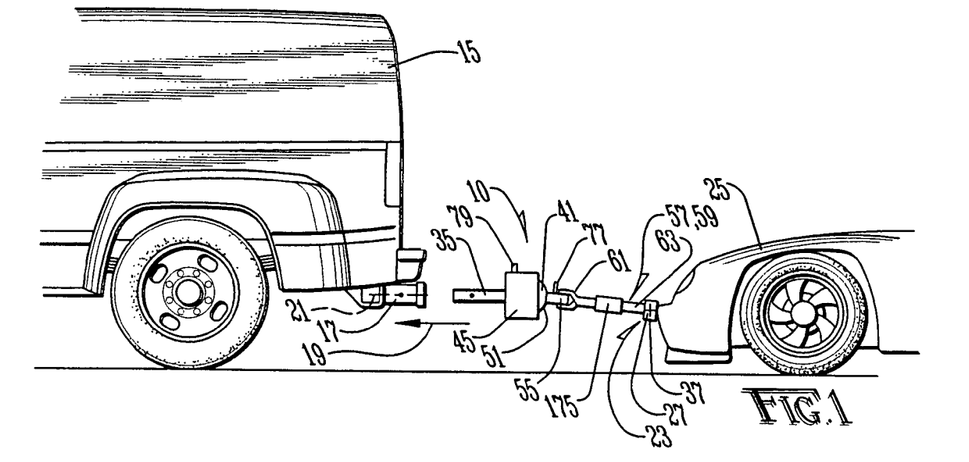
FIG. 1 is a side elevational view of tow bar having a single, centrally-located ball-and-socket joint for accommodating pitch, yaw and roll movements between a towing vehicle and a towed vehicle, according to the present invention.

The first connection mechanism 13 includes a forward projection 35 that is structured and configured to be received by the conventional receiver hitch 17 fixedly mounted at the rear of the towing vehicle 15.

The second connection mechanism 23 includes one or more brackets 37 connected to the towed vehicle, or other suitable means, such as those disclosed in U.S. Pat. No. 5,224,960 issued Jul. 6, 1993 to Lee H. Duncan and U.S. Pat. No. 5,356,166 issued Oct. 18, 1994 to Merton K. Hahne et all, both of which disclosures are incorporated herein by reference.

The third connection mechanism 33 includes a one-piece spherically-shaped member 41, having a two-inch diameter for example, sometimes referred to herein as a ball member 41, which has a ball member center point 43 at the center of curvature of the ball member 41. The third connection mechanism 33 also includes a body member 45, sometimes referred to herein as a socket member 45, which is fixedly and securely connected to the forward projection 35. The socket member 45 includes a main cavity 47 with a main cavity center point 49 located at the center of curvature of the main cavity 47. The radius of curvature of the main cavity 47 is slightly greater than the radius of the ball member 41. The main cavity 47 is structured and dimensioned to rotatively capture the ball member 41 therein, as described herein, such that the ball member center point 43 coincides with the main cavity center point 49 of the main cavity 47, sometimes referred to herein as the third connection mechanism center point.

Figure 2A:
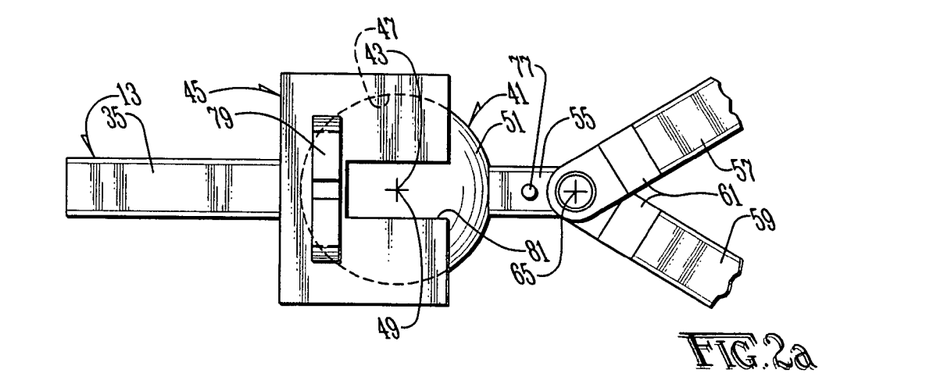
FIG. 2a is an enlarged and fragmentary, top plan view of the tow bar of the present invention.
Figure 2B:
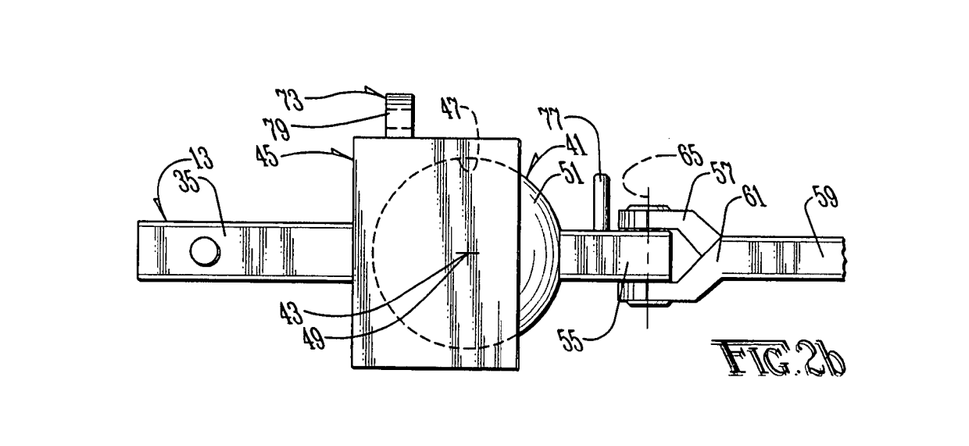
FIG. 2b is an enlarged and fragmentary, side elevational view of the tow bar of the present invention.

As shown in FIGS. 2a and 2b, an exposed portion 51 of the ball member 41 extends rearwardly through a rearwardly-facing opening 53 of the socket member 45. The third connection mechanism 33 further includes a rearward projection 55 fixedly and securely connected to the exposed portion 51 of the ball member 41, and at least one, preferably two, towbar arms 57, 59, each having a front end 61 and a rear end 63.

Figure 3:
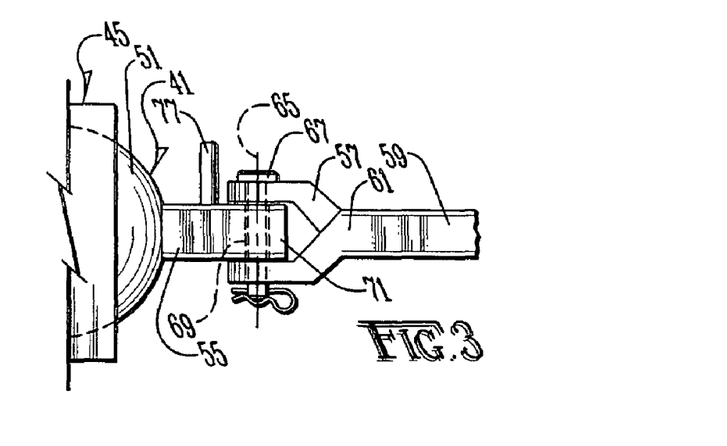
FIG. 3 is a further enlarged and partially cross-sectional, fragmentary side elevational view of a rearward projection of the tow bar of the present invention.

The rear ends 63 of the two towbar arms 57, 59 are operatively spaced apart and the front ends 61 of the two towbar arms 57, 59 are not spaced apart but are connected to the rearward projection 55 to be movable about a generally vertically-oriented, towbar arm-separating axis 65. The towbar arm-spreading axis 65 is provided by a pin 67 through a vertical-oriented throughbore 69 in a distal end 71 of the rearward projection 55, as shown in FIG. 3.

It should be noted that due to the freely rotatable engagement between the ball member 41 and the socket member 45 as described herein, the only movement about the towbar arm-spreading axis 65 occurs when the towbar arms 57, 59 are being spread apart for connection to the towed vehicle 25. In other words, substantially all yaw movements are compensated for by rotational movement of the ball member 41 within the socket member 45, not by movement about the towbar arm-separating axis 65. As a result, substantially no wear occurs at the connection between the towbar arms 57, 59 and the rearward projection 55, even after extended periods of use.

Further, all roll movements and pitch movements in the third connection mechanism 33 are compensated by rotational movement of the ball member 41 within the socket member 45. Simply stated, all yaw, pitch and roll movements within the tow bar 10 between the longitudinally-oriented axis 21, defined by the connection of the first connection mechanism 13 to the towing vehicle 15, and the transverse horizontal axis 27, defined by the connection of the second connection mechanism 23 to the towed vehicle 25, that are operatively needed while the towed vehicle 25 is being towed by the towing vehicle 15, are effectively accommodated by a single moving part: the ball member 41 within the socket member 45.

Further, any and all moments arising from the towbar arms 57, 59 being mounted on opposing sides of the rearward projection 55, which moments would otherwise be created internally within the towbar 10, are automatically and fully accommodated by virtue of the rotational engagement between the ball member 41 and the socket member 45.

The socket member 45 in conjunction with the ball member 41 of the third connection mechanism 33 are configured and structured to cooperatively accommodate all pitch, yaw and roll movements, including any and all combinations thereof, between the longitudinally-oriented axis 21 and the transverse horizontally-oriented axis 27. Those pitch, yaw and roll movements and any and all combinations thereof, between the longitudinally-oriented axis 21 of the first connection mechanism 13 and the towing vehicle 15 and the transverse horizontally-oriented axis 27 of the second connection mechanism 23 and the towed vehicle 25, occur at the main cavity center point 49 and the ball member center point 43.

Due to the accommodation of all relative pitch, yaw and roll movements including any and all combinations thereof between the first connection mechanism 13 to the towing vehicle 15 and the second connection mechanism 23 to the towed vehicle 25 about a single point by a single moving part, the ball member 41 within the socket member 45, only one moment is operatively created within the tow bar 10 of the present invention. The magnitude of the lever arm of that one moment is determined by the spacing between the main cavity center point 49 and the receiver hitch 17. Due to the simplicity of the structure of the tow bar 10 of the present invention, the magnitude of the lever arm of that one moment can be minimized by minimizing the spacing between the main cavity center point 49 and the receiver hitch 17. In other words, the structure of the tow bar 10 of the present invention has reduced the plurality of moments, and the greater magnitudes thereof that are inherent in the prior art Johnson and Parent tow bar, have been reduced to a single moment having a lever arm with a relative small magnitude, with the effects of that one moment being borne only by the socket member 45 and the forward projection 35, which forward projection 35 is almost entirely contained within the receiver hitch 17 of the towing vehicle 15.

Figure 4:
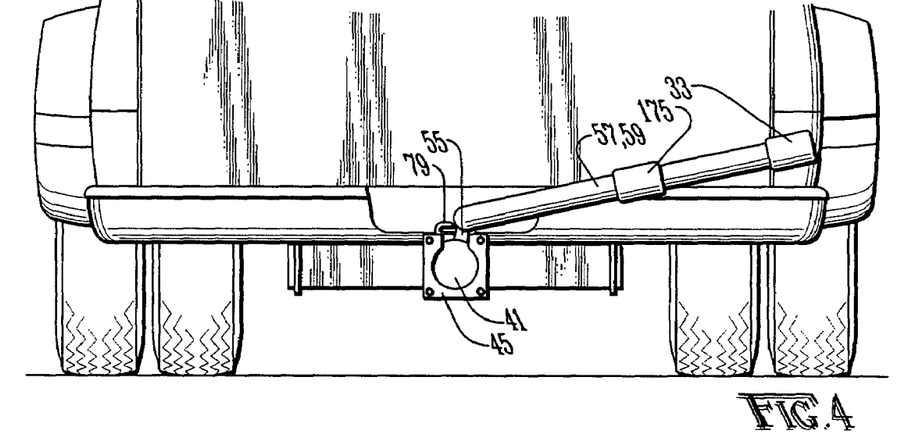
FIG. 4 is a rear elevational view showing the tow bar of the present invention in a stowed configuration.

The tow bar 10 of the present invention also includes a securing mechanism 73 for securing the tow bar 10 in a stowed configuration 75, as shown in FIG. 4. The securing mechanism 73 includes a first securing device 77 connected to the rearward projection 55; a second securing device 79 connected to the socket member 45; and a notch 81 in the socket member 45 wherein the notch 81 is structured and configured to accommodate the rearward projection 55 as the ball member 41 is rotated within the socket member 45 in order to place the rearward projection 55 in an upright orientation. The securing mechanism 77 is structured and configured wherein, as the rearward projection is rotated to an upright orientation, the first securing device 77 passes through an oblong notch 83 in the second securing device 79. Then, by tilting the rearward projection 55 to the right or left, the first securing device 77 engages one of the ends 85 of the oblong notch 83 of the second securing device 79, thereby releasably securing the tow bar 10 in the stowed configuration 75 on the back of the towing vehicle 15. The width of notch 81 may need to be increased near the forward end thereof in order to permit the first securing device 77 to be fully engaged with one of the ends 85 of the oblong notch 83 of the second securing device 79.

For ease of assembly, the socket member 45 may comprise two separate portions: a forward portion 103, having a rearwardly-facing hemispherically-shaped cavity 105, and a rearward portion 107, having a forwardly-facing truncated hemispherically-shaped cavity 109. Each of the hemispherically-shaped cavities 105, 109 has a radius of curvature, which is slightly greater than the radius of the ball member 41, and a center of curvature.

Figure 2C:
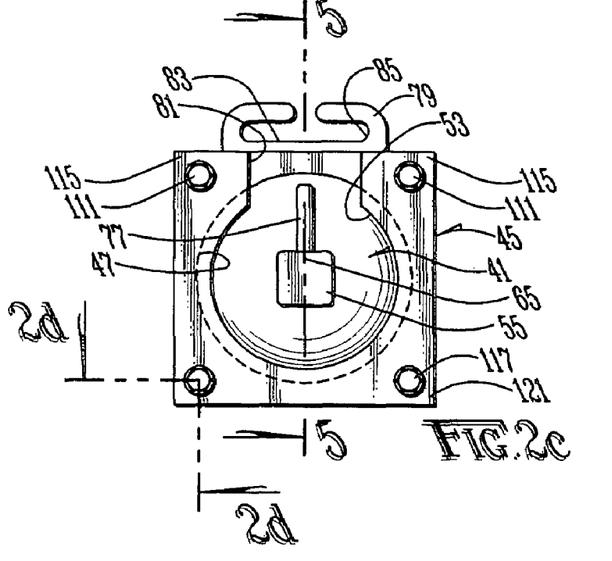
FIG. 2c is an enlarged and fragmentary, rear elevational view of the tow bar of the present invention.
Figure 2D:
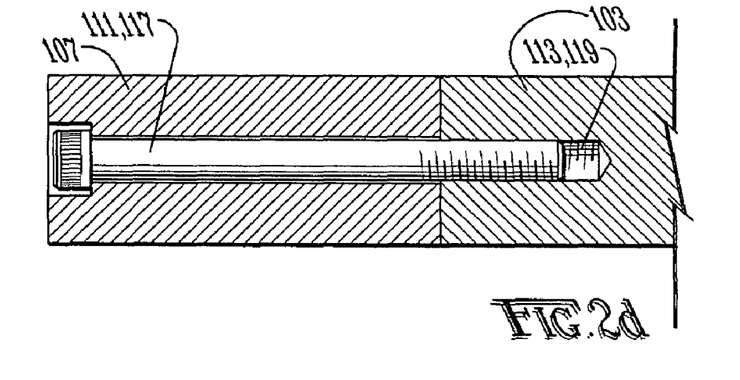
FIG. 2d is an enlarged and fragmentary, cross-sectional view of a cap bolt used to assembly a forward portion and a rearward portion to form a socket member of the tow bar of the present invention, the view taken along cut 2d—2d of FIG. 2c.
Figure 5:
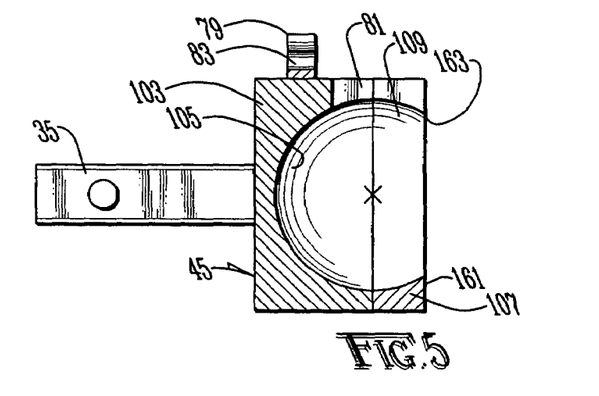
FIG. 5 is an enlarged and fragmentary, cross-sectional view of a front portion and a rear portion of a socket member of the tow bar of the present invention, the view taken along line 5—5 of FIG. 2c.

During assembly, the forward and rearward portions 103, 107 are securely fastened together with fastening means, such as a pair of longitudinally-oriented cap bolts 111 with threads for mating threaded partial bores 113 located near the two upper corners 115 of the forward and rearward portions 103, 107, as indicated in FIGS. 2c and 5, and another pair of longitudinally-oriented cap bolts 117 with threads for mating threaded partial bores 119 located near the two lower corners 121 of the forward and rearward portions 103, 107, or other suitable fastening arrangement. The two bolts 111 at the upper corners 115 and along each side of the notch 81 provide supplemental strength and support for the rearward portion 107 on each side of the notch 81 during use. Preferably, the heads of the cap bolts 111, 117 are countersunk, as indicated in FIG. 5.

Assembly of the forward and rearward portions 103, 107 with the fastening means to form the socket member 45 also brings the hemispherically-shaped cavities 105, 109 of the forward and rearward portions 103, 107 together to thereby cooperatively form the main cavity 47 for rotatively capturing the ball member 41 therein with the forward and rearward portions 103, 107 abuttingly engaging each other along a plane 123 passing through the main cavity center point 49 of the main cavity 47 formed by the hemispherically-shaped cavities 105, 109. After such assembly, the centers of curvature of the cavities 105, 109 coincide with the ball member center point 43.

Figure 6:
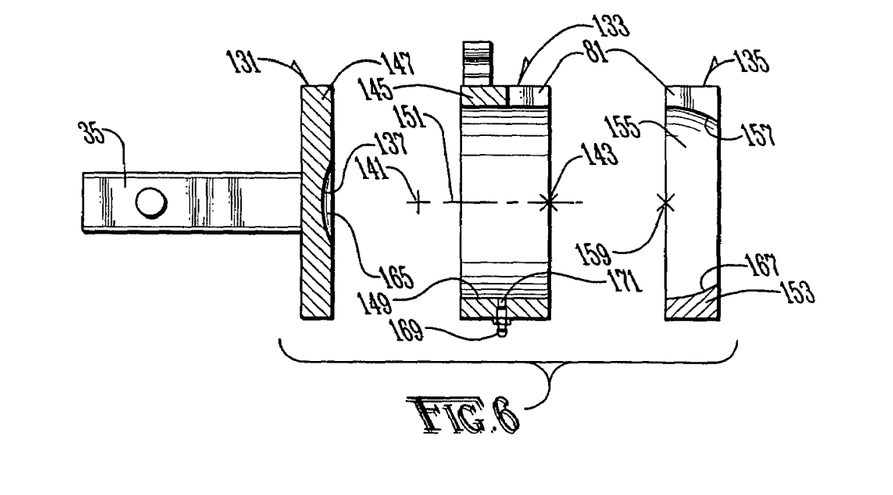
FIG. 6 is an enlarged and fragmentary, exploded cross-sectional view of a forward section, an intermediate section and a rearward section of the socket member of the tow bar of the present invention, the view taken along line 5—5 of FIG. 2c.

For some applications, such as when it is desired to reduce production costs for example, the socket member 45, instead of comprising the forward portion 103 and the rearward portion 107, may comprise three separate sections: a forward section 131, an intermediate section 133, and a rearward section 135, wherein the fore and aft surfaces of each of these three sections 131, 133, 135 are preferably planar and parallel, as indicated in FIG. 6.

The forward section 131 is preferably a single piece of very rugged and durable metal, or other suitable material, that can easily withstand the substantial forces and abuses to which the tow bar 10 may be subjected during use. The forward section 131 includes a forward cavity 137 which can be described as a rearwardly-facing spherically-shaped depression 137, the center of curvature 141 of which coincides with the main cavity center point 143 when the three sections 131, 133, 135 are assembled to form the socket member 45. The radius of curvature of the depression 137 is slightly greater than the radius of the ball member 41.

The intermediate section 133, a single piece, is preferably constructed of the same material as the forward section 131. The peripheral form 145 of the intermediate section 133 is congruent with the peripheral form 147 of the forward section 131. The intermediate section 133 includes a cylindrically-shaped bore 149 therethrough, wherein the diameter of bore 149 is greater than the diameter of the ball member 41 and wherein the centerline 151 of the bore 149 is perpendicular to the fore and aft surfaces of the intermediate section 133 and also passes through the main cavity center point 143 when the three sections 131, 133, 135 are assembled to form the socket member 45.

The rearward section 135, a single piece, is also preferably constructed of the same material as the forward section 131. The peripheral form 153 of the rearward section 135 is congruent with the peripheral form 145 of the intermediate section 133. The rearward section 135 includes a rearward cavity 155 that includes a spherically-shaped shoulder 157 which has a radius of curvature that is slightly greater than the radius of the ball member 41 and operatively mates with the ball member 41 when the socket member 45 is assembled with the ball member 41 thereinside. The shoulder 157 has a center of curvature 159 which coincides with the main cavity center point 143 when the three sections 131, 133, 135 are assembled to form the socket member 45.

The three sections 131, 133, 135, and the cavities 137, 155 and the bore 149 thereof, are dimensioned and configured such that, after assembly of the socket member 45 with the ball member 41 captured therein, the exposed portion 51 of the ball member 41 extends substantially rearwardly from rear surface 161 of the rearward section 135 through an opening 163 defined by the rear surface 161 of the rearward section 127 by the shoulder 157, as shown in FIGS. 2a and 2b. The opening 163 is dimensioned such that the extent to which the exposed portion 51 of the ball member 41 protrudes rearwardly from the rear surface 161 is maximized while retaining a sufficient shoulder 157 to reliably prevent the ball member 41 from being forced through the opening 163 during use of the tow bar 10.

When the three sections 131, 133, 135 are firmly and securely assembled together with the ball member 41 captured therein, the curvatures of the forward cavity 131 and the shoulder 157 provide forward and rearward bearing surfaces 165, 167 for the ball member 41 wherein those bearing surfaces 165, 167 cooperatively form different sections of the spherically-shaped main cavity 47, with a radius of curvature that is slightly greater than the radius of the ball member 41, and a center of curvature 143 that coincides with the center point 43 of the ball member 41. Since the radius of curvature of the bearing surfaces 165, 167 is slightly greater than the radius of the ball member 41, the ball member 41 can freely rotate within the bearing surfaces 165, 167 after the sections 131, 133, 135 are assembled to form the socket member 45. A zert 169 threaded into a throughbore 171 in the intermediate portion 133 provides means for injecting lubricant into the bore 149 for operatively lubricating rotational movement of the ball member 41 within main cavity 47, primarily for lubricating the bearing surfaces 165, 167 of the forward and rearward sections 131, 135.

The rearward section 135 and perhaps the intermediate section 133 include the hereinbefore-described notch 81 for receiving the rearward projection 55 when the rearward projection 55 is displaced upwardly to the stowed configuration 75.

Figure 7:
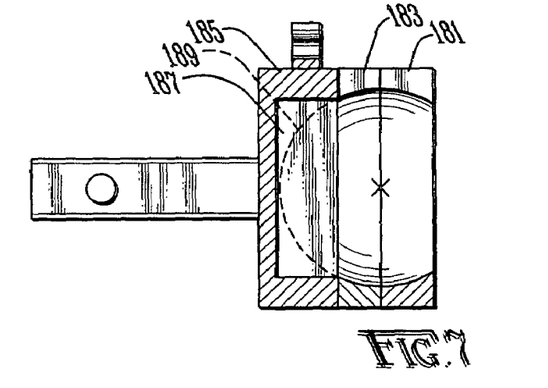
FIG. 7 is an enlarged and fragmentary cross-sectional view showing a variation of the three-section structure shown in FIG. 6 of the socket member of the tow bar of the present invention, the view taken along line 5—5 of FIG. 2c.

A variation of the hereinbefore described three-section version of the socket member is shown in FIG. 7 wherein a first section 181 and a second section 183 thereof are identical to the rearward section 135 shown in FIG. 6. A third section 185 has a cylindrically-shaped cavity therein to avoid contact with the ball member 41 as indicated by the dotted line designated by numeral 189.

Figure 8A:
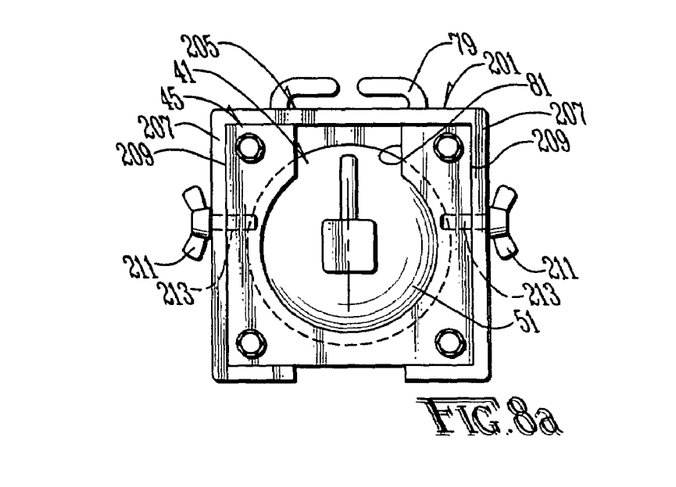
FIG. 8a is an enlarged and fragmentary, rear elevational view of an optional notch-reinforcing mechanism of the tow bar of the present invention.
Figure 8B:
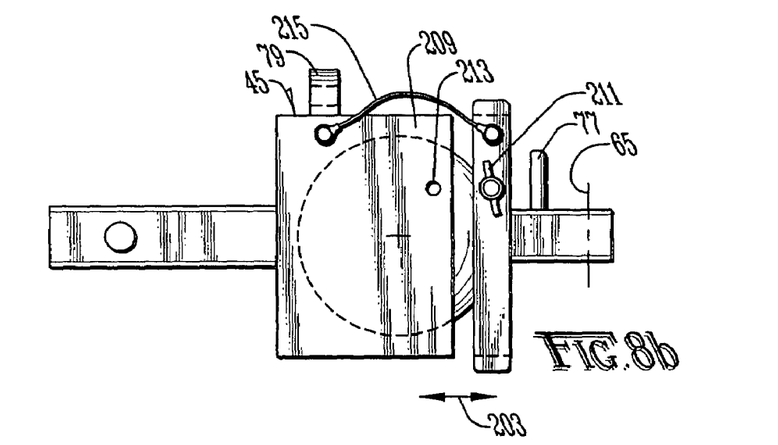

For some applications, it may be desirable to include an optional notch-reinforcing mechanism 201, as shown in FIGS. 8a and 8b. Inner surfaces of the notch-reinforcing mechanism 201 are dimensioned such that the notch-reinforcing mechanism 201 can be snugly but easily slipped onto and off of the socket member 45 as indicated by the double-headed arrow designated by numeral 203 in FIG. 8b. As upper portion 205 of the notch-reinforcing mechanism 201 spans the notch 81. Side portions 207 of the notch-reinforcing mechanism 201 bear against opposing sides 209 of the socket member 45 to prevent the notch 81 from spreading in situations where excessive stress may occur between the ball member 41 and the socket member 45. The notch-reinforcing mechanism 201 is held in place by a pair of wingbolts 211 having male threads that mate with a pair of threaded partial bores 213 in the socket member 45, as shown in FIG. 8a. A lanyard 215 may be used to prevent loss of the notch-reinforcing mechanism 201.

The wingbolts 211 are loosened and the notch-reinforcing mechanism 201 is removed from the socket mechanism 45 in order to place the tow bar 10 in the stowed configuration 75. If the notch-reinforcing mechanism 201 is repositioned on the socket member 45 after the tow bar 10 is placed in the stowed configuration 75, the notch-reinforcing mechanism 201 can be used to prevent the tow bar 10 from unexpectedly being released from the stowed configuration 75 by blocking the notch 81 so the rearward projection 55 cannot return to a horizontal orientation.

If removal of the notch-reinforcing mechanism 201 should become difficult to remove, it may be an indication that the socket member 45 has been irreversibly strained beyond its material limits. In that event, the notch-reinforcing mechanism 201 may serve as a warning mechanism in regard to the integrity of the socket member 45, particularly in regard to the socket member 45 in the vicinity of the notch 81.

Figure 9:
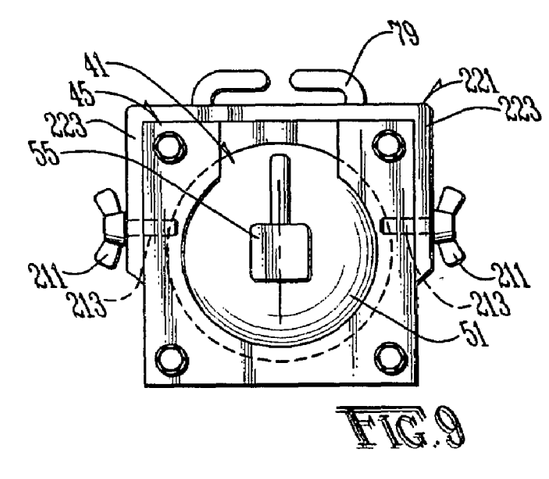

A variation 221 of the notch-reinforcing mechanism 201 is shown in FIG. 9. Side portions 223 of the variation 221 only partially extend down opposing sides 209 of the socket member 45.

Figure 10:
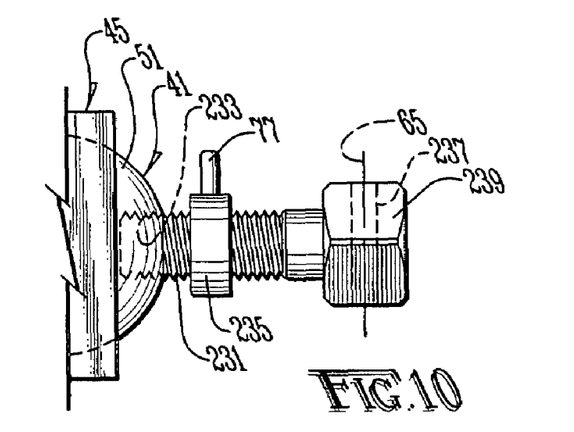
FIG. 10 is a further enlarged view of a variation of the rearward projection of the tow bar of the present invention.

A variation of the rearward projection 55 is shown in FIG. 10. A bolt 231 is threadably secured in a threaded partial bore 233 in the ball member 41. The first securing device 77 is attached to a collar 235 mounted on the threads of the bolt 231. The towbar arm-spreading axis 65 is provided by a throughbore 237 through a head 239 of the bolt 231.

It may be desirable to minimize exposure of the ball member 41 to debris and various other adverse elements of the environment by providing a flexible, corrugated boot to cover the various potential accesses to the main cavity 47. It may also be desirable to include a mechanism 175 in each towbar arm 57, 59 that allows the length of the respective towbar arm 57, 59 to be manually changed to simplify connecting the tow bar 10 to the towed vehicle 25 wherein each of the towbar arms 57, 59 automatically returns to its normal towing length by simply driving the towing vehicle 15 forward after the tow bar 10 has been connected to the towed vehicle 25. Another benefit provided by the mechanisms 175 is the ability to shorten the reach of the towbar arms 57, 59 when the tow bar 10 has been placed in the stowed configuration 75 on the back of the towing vehicle 15. Examples of such mechanisms 175 are disclosed in U.S. Pat. No. 5,224,960 issued Jul. 6, 1993 to Lee H. Duncan and U.S. Pat. No. 5,356,166 issued Oct. 18, 1994 to Merton K. Hahne et al, both of which disclosures are incorporated herein by reference.

In an application of the present invention, the forward projection 35 is inserted and secured in the conventional receiver hitch 17 of the towing vehicle 15. If the tow bar 10 has been previously secured to the towing vehicle 15 and is in the stowed configuration 75, then the towbar arms 57, 59 are grasped and maneuvered to disengage the first securing device 77 from the second securing device 79, to rotate the ball member 41 within the socket member 45 to thereby displace the rearward projection 55 rearwardly through the notch 83 toward the towed vehicle 25, and to secure the second connection mechanism 23 to the towed vehicle 25. Of course, an application of the tow bar 10 would also involve the proper use of safety chains, electrical hookups, etc., as commonly known in the art.

Conversely, if the towed vehicle 25 is to be temporarily disconnected from the towing vehicle 15, the second connection mechanism 23 would be disconnected from the towed vehicle 25; the towbar arms 57, 59 would be used to rotate the ball member 41 within the socket member 45 to thereby displace the rearward projection 55 along the notch 81 to an upright orientation, and the rearward projection 65 would be tilted sidewise to cooperatively engage the first securing device 77 and the second securing device 79 to thereby secure the tow bar 10 in the stowed configuration 75 on the back of the towing vehicle 15. If it is desired to disconnect both the towed vehicle 25 and the tow bar 10 from the towing vehicle 15, the second connection mechanism 23 is disconnected from the towed vehicle 25 and the forward projection 35 is unsecured and withdrawn from the conventional receiver hitch 17 of the towing vehicle 15. If it is desired to store the tow bar 10 in the stowed configuration 79, the tow bar 10 would usually be returned to the stowed configuration 75 before removing the forward projection 35 from the conventional receiver hitch 17 of the towing vehicle 15.

It is to be understood that while certain forms of the present invention have been illustrated and described herein, it is not to be limited to the specific forms or arrangement of parts described and shown.

What is claimed and desired to be covered by Letters Patent is as follows:

1. A tow bar for connecting a towed vehicle to a towing vehicle, the tow bar comprising:
   (a) a first connection mechanism connected to the towing vehicle, the first connection mechanism defining a longitudinally-oriented axis that is fixed relative to the towing vehicle;
   (b) a second connection mechanism connected to the towed vehicle, the second connection mechanism defining a transverse horizontally-oriented axis that is fixed relative to the towed vehicle; and
   (c) a third connection mechanism connecting the first connection mechanism to the second connection mechanism, the third connection mechanism defining a third connection mechanism center point, the third connection mechanism including:
      (1) a one-piece spherically-shaped ball member having a radius and a ball member center point; and
      (2) a socket member having a main cavity with a main cavity center point and a radius of curvature, which is slightly greater than the radius of the ball member, and
      (3) wherein the ball member is rotatively captured within the socket member with the ball member center point and the main cavity center point coinciding with the third connection mechanism center point; and
   (d) wherein the third connection mechanism is configured and structured to allow pitch, yaw and roll movements, including any and all combinations thereof, of the transverse horizontally-oriented axis, defined by the second connection mechanism, relative to the longitudinally-oriented axis, defined by the first connection mechanism, and wherein the pitch, yaw and roll movements between the transverse horizontally-oriented axis, defined by the second connection mechanism, and the longitudinally-oriented axis, defined by the first connection mechanism, occur at the third connection mechanism center point.

2. The tow bar as described in claim 1, wherein the first connection mechanism includes a forward projection which is structured and configured to be received by a conventional receiver hitch of the towing vehicle, wherein the forward projection is fixedly connected to the third connection mechanism.

3. The tow bar as described in claim 1 wherein the third connection mechanism further includes:
   (a) an exposed portion of the ball member extending rearwardly from a rear surface of the socket member; and
   (b) a rearward projection fixedly connected to the exposed portion of the ball member.

4. The tow bar as described in claim 3 wherein the third connection mechanism further includes at least one towbar arm having a forward end and a rear end, the forward end being pivotally connected to the rearward projection and the rear end being connected to the second connection mechanism.

5. The tow bar as described in claim 4 wherein the at least one towbar arm includes two towbar arms, each having a forward end and a rear end, wherein the rear ends thereof are spaced apart and connected to the second connection mechanism, and wherein the forward ends thereof are not spaced apart and are pivotally connected to the rearward projection.

6. The tow bar as described in claim 5, wherein the forward ends of the two towbar arms can each move about a towbar arm-separating axis relative to the rearward projection.

7. A tow bar for connecting a towed vehicle to a towing vehicle, the tow bar comprising:
   (a) a first connection mechanism connected to the towing vehicle, the first connection mechanism:
      (1) including a forward projection structured and configured to be received by a conventional receiver hitch of the towing vehicle, and
      (2) defining a longitudinally-oriented axis that is fixed relative to the towing vehicle;
   (b) a second connection mechanism connected to the towed vehicle, the second connection mechanism:
      (1) including at least one bracket attached to the towed vehicle, and
      (2) defining a transverse horizontally-oriented axis that is fixed relative to the towed vehicle;
   (c) a third connection mechanism connecting the first connection mechanism to the second connection mechanism, the third connection mechanism including:
      (1) a ball member having a ball member center point and an exposed portion,
      (2) a socket member fixedly connected to the forward projection, the socket member having a rearward portion with a rear surface and a forward portion, the rearward and forward portions cooperatively forming a spherically-shaped main cavity having a main cavity center point therein, the main cavity being structured and configured to rotatively capture the ball member therein wherein the exposed portion of the ball member extends rearwardly from the rear surface of the rearward portion, the rearward portion abutting the forward portion along a plane that passes through the main cavity center point,
(3) a rearward projection fixedly connected to the exposed portion of the ball member, and
(4) two towbar arms each having a forward end and a rear end, wherein the rear ends thereof are operatively spaced apart and the forward ends thereof are not spaced apart and are movably connected to the rearward projection about a towbar arm-separating axis; and
(d) a securing mechanism structured and configured to secure the third connection mechanism in a stowed configuration, the securing mechanism including:
(1) a first securing device connected to the rearward projection,
(2) a notch in the rearward portion, the notch being structured and configured to accommodate the rearward projection as the ball member is rotated within the socket member in order to place the rearward projection in an upright orientation, and
(3) a second securing device connected to the socket member; and
(e) wherein the third connection mechanism is configured and structured to accommodate pitch, yaw and roll movements, including any and all combinations thereof, of the transverse horizontally-oriented axis, defined by the second connection mechanism, relative to the longitudinally-oriented axis, defined by the first connection mechanism, and wherein the pitch, yaw and roll movements, between the transverse horizontally-oriented transverse axis defined by the second connection and the longitudinally-oriented axis of the first connection mechanism, occur at the main cavity center point and the ball member center point; and
(f) wherein as the ball member is rotatable within the socket member to dispose the rearward projection upwardly within the notch, the first securing device in conjunction with the second securing device releasably securing the third connection mechanism in the stowed configuration.

8. A tow bar for connecting a towed vehicle to a towing vehicle, the tow bar comprising:
(a) a first connection mechanism connected to the towing vehicle, the first connection mechanism defining a longitudinally-oriented axis that is fixed relative to the towing vehicle;
(b) a second connection mechanism connected to the towed vehicle, the second connection mechanism defining a transverse horizontally-oriented axis that is fixed relative to the towed vehicle;
(c) a third connection mechanism connecting the first connection mechanism to the second connection mechanism, the third connection mechanism defining a third connection mechanism center point, the third connection mechanism including:
(1) a one-piece spherically-shaped ball member having a radius and a ball member center point; and
(2) a socket member having a main cavity with a main cavity center point and a radius of curvature, which is slightly greater than the radius of the ball member, and
(3) wherein the ball member is rotatively captured within the socket member with the ball member center point and the main cavity center point coinciding with the third connection mechanism center point; and (d) a securing mechanism structured and configured to secure the third connection mechanism in a stowed configuration; and
(e) wherein the third connection mechanism is configured and structured to allow pitch, yaw and roll movements, including any and all combinations thereof, of the transverse horizontally-oriented axis, defined by the second connection mechanism, relative to the longitudinally-oriented axis, defined by the first connection mechanism, and wherein the pitch, yaw and roll movements between the transverse horizontally-oriented axis, defined by the second connection mechanism, and the longitudinally-oriented axis, defined by the first connection mechanism, occur at the third connection mechanism center point.

9. A tow bar for connecting a towed vehicle to a towing vehicle, the tow bar comprising:
(a) a first connection mechanism connected to the towing vehicle, the first connection mechanism defining a longitudinally-oriented axis that is fixed relative to the towing vehicle;
(b) a second connection mechanism connected to the towed vehicle, the second connection mechanism defining a transverse horizontally-oriented axis that is fixed relative to the towed vehicle; and
(c) a third connection mechanism connecting the first connection mechanism to the second connection mechanism, the third connection mechanism defining a third connection mechanism center point, the third connection mechanism including:
(1) a one-piece spherically-shaped ball member having a radius and a ball member center point; and
(2) a socket member having a main cavity with a main cavity center point and a radius of curvature, which is slightly greater than the radius of the ball member, wherein the socket member includes:
(A) a forward portion having a rearwardly-facing hemispherically-shaped forward cavity with a radius of curvature, which is slightly greater than the radius of the ball member, and a center of curvature;
(B) a rearward portion having a forwardly-facing truncated hemispherically-shaped rearward cavity with a radius of curvature, which is identical to the radius of curvature of the forward cavity of the forward portion, and a center of curvature; and
(C) fastening means; and
(D) wherein assembly of the forward portion, the rearward portion and the ball member with the fastening means forms the main cavity wherein the centers of curvature of the cavities of the forward and rearward portions and the ball member center point all coincide with the third connection mechanism center point, rotatively capturing the ball member therein, and
(d) wherein the third connection mechanism is configured and structured to allow pitch, yaw and roll movements, including any and all combinations thereof, of the transverse horizontally-oriented axis, defined by the second connection mechanism, relative to the longitudinally-oriented axis, defined by the first connection mechanism, and wherein the pitch, yaw and roll movements between the transverse horizontally-oriented axis, defined by the second connection mechanism, and the longitudinally-oriented axis, defined by the first connection mechanism, occur at the third connection mechanism center point.

10. The tow bar as described in claim 9 wherein, after assembly with the fastening means, the rearward portion abuts the forward portion along a plane that passes through the third connection mechanism center point.

11. The tow bar as described in claim 9, wherein the first connection mechanism includes a forward projection structured and configured to be received by a conventional receiver hitch of the towing vehicle and wherein the forward projection is fixedly connected to the forward portion of the socket member.

12. A tow bar for connecting a towed vehicle to a towing vehicle, the tow bar comprising:
   (a) a first connection mechanism connected to the towing vehicle, the first connection mechanism defining a longitudinally-oriented axis that is fixed relative to the towing vehicle;
   (b) a second connection mechanism connected to the towed vehicle, the second connection mechanism defining a transverse horizontally-oriented axis that is fixed relative to the towed vehicle; and
   (c) a third connection mechanism connecting the first connection mechanism to the second connection mechanism, the third connection mechanism defining a third connection mechanism center point, the third connection mechanism including:
      (1) a one-piece spherically-shaped ball member having a radius, an exposed portion, and a ball member center point,
      (2) a socket member having a main cavity with a main cavity center point and a radius of curvature, which is slightly greater than the radius of the ball member, and
      (3) a rearward projection fixedly connected to the exposed portion of the ball member, the rearward projection including:
         (A) the ball member having a threaded partial bore in the exposed portion thereof, and
         (B) a bolt threadably secured in the threaded partial bore, and
      (4) wherein the ball member is rotatively captured within the socket member with the ball member center point and the main cavity center point coinciding with the third connection mechanism center point, the exposed portion of the ball member extending rearwardly from a rear surface of the socket member; and
   (d) wherein the third connection mechanism is configured and structured to allow pitch, yaw and roll movements, including any and all combinations thereof, of the transverse horizontally-oriented axis, defined by the second connection mechanism, relative to the longitudinally-oriented axis, defined by the first connection mechanism, and wherein the pitch, yaw and roll movements between the transverse horizontally-oriented axis, defined by the second connection mechanism, and the longitudinally-oriented axis, defined by the first connection mechanism, occur at the third connection mechanism center point.

13. A tow bar for connecting a towed vehicle to a towing vehicle, the tow bar comprising:
   (a) a first connection mechanism connected to the towing vehicle, the first connection mechanism defining a longitudinally-oriented axis that is fixed relative to the towing vehicle;
   (b) a second connection mechanism connected to the towed vehicle, the second connection mechanism defining a transverse horizontally-oriented axis that is fixed relative to the towed vehicle;
   (c) a third connection mechanism connecting the first connection mechanism to the second connection mechanism, the third connection mechanism defining a third connection mechanism center point, the third connection mechanism including:
      (1) a one-piece spherically-shaped ball member having a radius and a ball member center point,
      (2) a socket member having a main cavity with a main cavity center point and a radius of curvature, which is slightly greater than the radius of the ball member, an exposed portion of the ball member extending rearwardly from a rear surface of the socket member, and
      (3) a rearward projection fixedly connected to the exposed portion of the ball member, and
      (4) wherein the ball member is rotatively captured within the socket member with the ball member center point and the main cavity center point coinciding with the third connection mechanism center point; and
   (d) a securing mechanism structured and configured to secure the third connection mechanism in a stowed configuration, the securing mechanism including:
      (1) a first securing device connected to the rearward projection,
      (2) a notch structured and configured to accommodate the rearward projection as the ball member is rotated within the socket member in order to place the rearward projection in an upright orientation, and
      (3) a second securing device connected to the socket member, and
      (4) wherein, as the ball member is rotated within the main body to dispose the rearward projection upwardly within the notch, the first securing device in cooperation with the second securing device releasably securing the third connection mechanism in the stowed configuration; and
   (e) wherein the third connection mechanism is configured and structured to allow pitch, yaw and roll movements, including any and all combinations thereof, of the transverse horizontally-oriented axis, defined by the second connection mechanism, relative to the longitudinally-oriented axis, defined by the first connection mechanism, and wherein the pitch, yaw and roll movements between the transverse horizontally-oriented axis, defined by the second connection mechanism, and the longitudinally-oriented axis, defined by the first connection mechanism, occur at the third connection mechanism center point.

14. The tow bar as described in claim 13, further including a removable notch-reinforcing mechanism.

15. A tow bar for connecting a towed vehicle to a towing vehicle, the tow bar comprising:
   (a) a first connection mechanism connected to the towing vehicle, the first connection mechanism defining a longitudinally-oriented axis that is fixed relative to the towing vehicle;
   (b) a second connection mechanism connected to the towed vehicle, the second connection mechanism defining a transverse horizontally-oriented axis that is fixed relative to the towed vehicle; and
   (c) a third connection mechanism connecting the first connection mechanism to the second connection mechanism, the third connection mechanism defining a third connection mechanism center point, the third connection mechanism including:

(1) a one-piece spherically-shaped ball member having a radius and a ball member center point; and (2) a socket member having a main cavity with a main cavity center point and a radius of curvature, which is slightly greater than the radius of the ball member, the socket member including:

(A) a forward section having a rearwardly-facing spherically-shaped forward depression with a radius of curvature, which is slightly greater than the radius of the ball member, and a center of curvature;

(B) an intermediate section having a cylindrically-shaped cavity therethrough with a radius, which is greater that the radius of the ball member, and a centerline;

(C) a rearward section having a shoulder defining a rearward-facing opening in a rear surface of the rearward section, the shoulder having a radius of curvature, which is slightly greater that the radius of the ball member and which is identical to the radius of curvature of the forward depression, and a center of curvature; and (D) fastening means; and (E) wherein assembly of the forward section, the intermediate section, the rearward section and the ball member with the fastening means, with the intermediate section sandwiched between the forward section and the rearward section, forms a central cavity wherein the centers of curvature of the forward depression, the shoulder of the rearward section and the ball member center point coincide with the third connection mechanism center point on the centerline of the intermediate portion, which centerline is perpendicular to the rear surface of the rearward section, the assembly rotatively capturing the ball member therein; and (d) wherein the third connection mechanism is configured and structured to allow pitch, yaw and roll movements, including any and all combinations thereof, of the transverse horizontally-oriented axis, defined by the second connection mechanism, relative to the longitudinally-oriented axis, defined by the first connection mechanism, and wherein the pitch, yaw and roll movements between the transverse horizontally-oriented axis, defined by the second connection mechanism, and the longitudinally-oriented axis, defined by the first connection mechanism, occur at the third connection mechanism center point.

16. A tow bar for connecting a towed vehicle to a towing vehicle, the tow bar comprising:

(a) a first connection mechanism connected to the towing vehicle, the first connection mechanism defining a longitudinally-oriented axis that is fixed relative to the towing vehicle;

(b) a second connection mechanism connected to the towed vehicle, the second connection mechanism defining a transverse horizontally-oriented axis that is fixed relative to the towed vehicle, the second connection mechanism includes a least one bracket secured to the towed vehicle; and (c) a third connection mechanism connecting the first connection mechanism to the second connection mechanism, the third connection mechanism defining a third connection mechanism center point, the third connection mechanism including:

(1) a one-piece spherically-shaped ball member having a radius and a ball member center point; and (2) a socket member having a main cavity with a main cavity center point and a radius of curvature, which is slightly greater than the radius of the ball member, and (3) wherein the ball member is rotatively captured within the socket member with the ball member center point and the main cavity center point coinciding with the third connection mechanism center point; and (d) wherein the third connection mechanism is configured and structured to allow pitch, yaw and roll movements, including any and all combinations thereof, of the transverse horizontally-oriented axis, defined by the second connection mechanism, relative to the longitudinally-oriented axis, defined by the first connection mechanism, and wherein the pitch, yaw and roll movements between the transverse horizontally-oriented axis, defined by the second connection mechanism, and the longitudinally-oriented axis, defined by the first connection mechanism, occur at the third connection mechanism center point.

* * * * *